United States Patent [19]

Consigli et al.

[11] 4,229,788
[45] Oct. 21, 1980

[54] INTERFACE UNIT FACILITATING COMMUNICATION BETWEEN DATA PROCESSOR AND PROGRAM-INTERRUPTING PERIPHERAL UNIT

[75] Inventors: Armando Consigli, Milan; Roberto Danna, Cinisello Balsamo, both of Italy

[73] Assignee: Società Italiana Telecomunicazioni Siemens S.p.A., Milan, Italy

[21] Appl. No.: 913,232

[22] Filed: Jun. 6, 1978

[30] Foreign Application Priority Data

Jun. 6, 1977 [IT] Italy ................. 24387 A/77

[51] Int. Cl.[3] .............................................. G06F 3/00
[52] U.S. Cl. ................................. 364/200; 235/92 CT
[58] Field of Search ... 364/900 MS File, 200 MS File; 235/92 CT

[56] References Cited
U.S. PATENT DOCUMENTS

| | | | |
|---|---|---|---|
| 3,902,162 | 8/1975 | Parkinson | 364/200 |
| 3,944,980 | 3/1976 | Riedmayr | 235/92 CT |
| 4,004,283 | 1/1977 | Bennett | 364/200 |
| 4,102,492 | 7/1976 | Gold | 235/92 CT |

*Primary Examiner*—Gareth D. Shaw
*Assistant Examiner*—David Y. Eng
*Attorney, Agent, or Firm*—Karl F. Ross

[57] ABSTRACT

A peripheral unit such as a teletypewriter, associated with a data processor but operating at a relatively slow rate so as to require an interruption of the processor's program when transmitting data, communicates with the processor through an interface unit comprising a sequential network switchable from a quiescent state (D) to an active state (C) via a preparatory state (A) and an intermediate state (B). The sequential network assumes its preparatory state (A) upon the appearance, at the interface unit, of an input/output instruction read out from a program store in the processor and addressed to the associated peripheral unit; the changeover to the intermediate state (B) occurs immediately thereafter if that peripheral unit emits a "data ready" signal (s). In the absence of overriding priorities within the processor or from higher-ranking peripheral units, an authorization signal (p) from the processor results in a switchover to the active state (C) commanding a program interruption; a confirmation signal (k) from the processor then restores the quiescent state (D) after causing transmission of the address of the associated peripheral unit to the processor, along with the data available at that unit.

2 Claims, 4 Drawing Figures

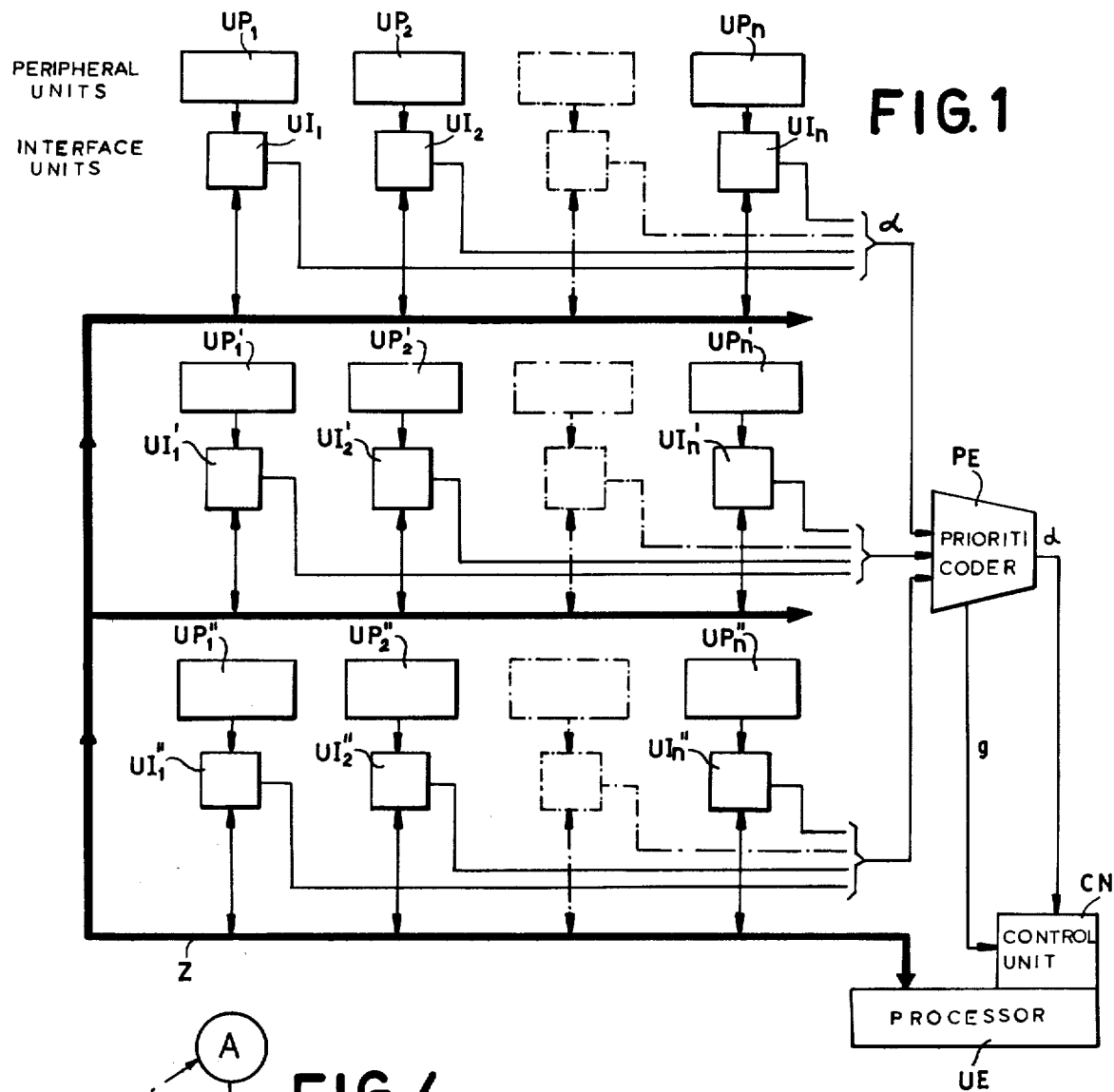

INTERFACE UNIT FACILITATING COMMUNICATION BETWEEN DATA PROCESSOR AND PROGRAM-INTERRUPTING PERIPHERAL UNIT

FIELD OF THE INVENTION

Our present invention relates to an electronic data-handling system and, more particularly, to an interface unit forming part of such a system to facilitate communication between an associated peripheral unit and a data processor serving a number of such peripheral units.

BACKGROUND OF THE INVENTION

In commonly owned U.S. patent application Ser. No. 839,883, filed 6 Oct. 1977 by Mario Bambara et al, now U.S. Pat. No. 4,160,289, there has been described a data processor dialoguing with a multiplicity of peripheral units with which the processor is able to exchange data in the presence of input/output instructions read out from a program memory. The macroinstructions stored in that memory (which also include transfer and branching instructions besides the aforementioned input/output instructions) are decoded in a control unit which establishes a subroutine on the basis of bit combinations of a current instruction, entered by the program memory in an associated register, and bit combinations of a forthcoming instruction present in the output of the memory but not yet loaded into the register. Each subroutine involves the readout of a number of microinstructions stored in another memory within the control unit itself.

Certain peripheral units (e.g. teletypewriters), when ready to transmit data to the processor, require an interruption of the program since their operating speed is slower than that of the processor. In the system of the prior Bambara et al application (U.S. Pat. No. 4,160,289) referred to, such program interruptions rank lower than an execution command emitted at the end of a microroutine as determined by a first priority coder within the control unit. A second priority coder in the control unit establishes an order of precedence among different peripheral units which may call for an interruption of the processor program. A subunit within the control unit prevents the occurrence of program interruptions at the conclusion of two immediately consecutive microroutines, thus requiring the extraction of at least one new macroinstruction from the corresponding memory between successive interruptions. A single peripheral unit, therefore, can occupy the processor for a limited time only.

OBJECT OF THE INVENTION

The object of our present invention is to provide an interface unit, individually associated with a peripheral unit of the slow-operating type referred to above, which facilitates the transmission of data from that peripheral unit to the processor along with the interruption of the program of the latter in an expeditious manner and with due consideration of priority conditions and processor availability.

SUMMARY OF THE INVENTION

An interface unit according to our invention comprises a sequential network which is switchable to a plurality of states including a quiescent state (D), a preparatory state (A), an active state (C) and, preferably, also an intermediate state (B). The network has input means, effective in its quiescent state (D), for switching it to its preparatory state (A) in response to the appearance of an instruction addressing the associated peripheral unit. A switchover to its active state (C), resulting in the emission of a program-suspension request ($\alpha$) to the processor, is carried out by stepping means effective in the preparatory state (A) in response to a data-ready signal (s) from the associated peripheral unit. When the processor acknowledges the request signal ($\alpha$) with a confirmation signal (k) generated by its control unit, the data transmission called for by the input/output instruction can take place; it is only then that the processor needs to be informed of the identity of the transmitting peripheral unit, with the aid of circuit means in the interface unit responsive to this confirmation signal, the stepping means being effective in the active state (C) to return the sequential network to its quiescent state (D) in the presence of that signal.

The provision of an intermediate state (B) between the preparatory and active states (A,C) makes the switchover to the active state conditional upon the absence of an overriding priority as determined by preferential circuitry such as the two priority coders disclosed in Bambara et al U.S. Pat. No. 4,160,289.

Pursuant to a more particular feature of our invention, the sequential network comprises a register for the storage of bit combinations representing the various states (A-D); a switching circuit, forming part of the aforementioned stepping means, feeds back a stored bit combination in modified form to represent the next-following state in the sequence. A multiplexer, constituting the aforementioned input means, has one input connected to receive an initial bit combination from an instruction transmitted by the processor and has another input connected to the switching circuit for receiving the modified bit combination therefrom.

BRIEF DESCRIPTION OF THE DRAWING

The above and other features of our invention will now be described in detail with reference to the accompanying drawing in which:

FIG. 1 is a block diagram showing a multiplicity of peripheral units and associated interface units served by a processor in a data-handling system embodying our invention;

FIG. 2 is a schematic representation of an input/output instruction emitted by the processor of FIG. 1;

FIG. 4 is a flow diagram illustrating the mode of operation of a sequential network included in the interface unit of FIG. 3.

SPECIFIC DESCRIPTION

Figure 3:
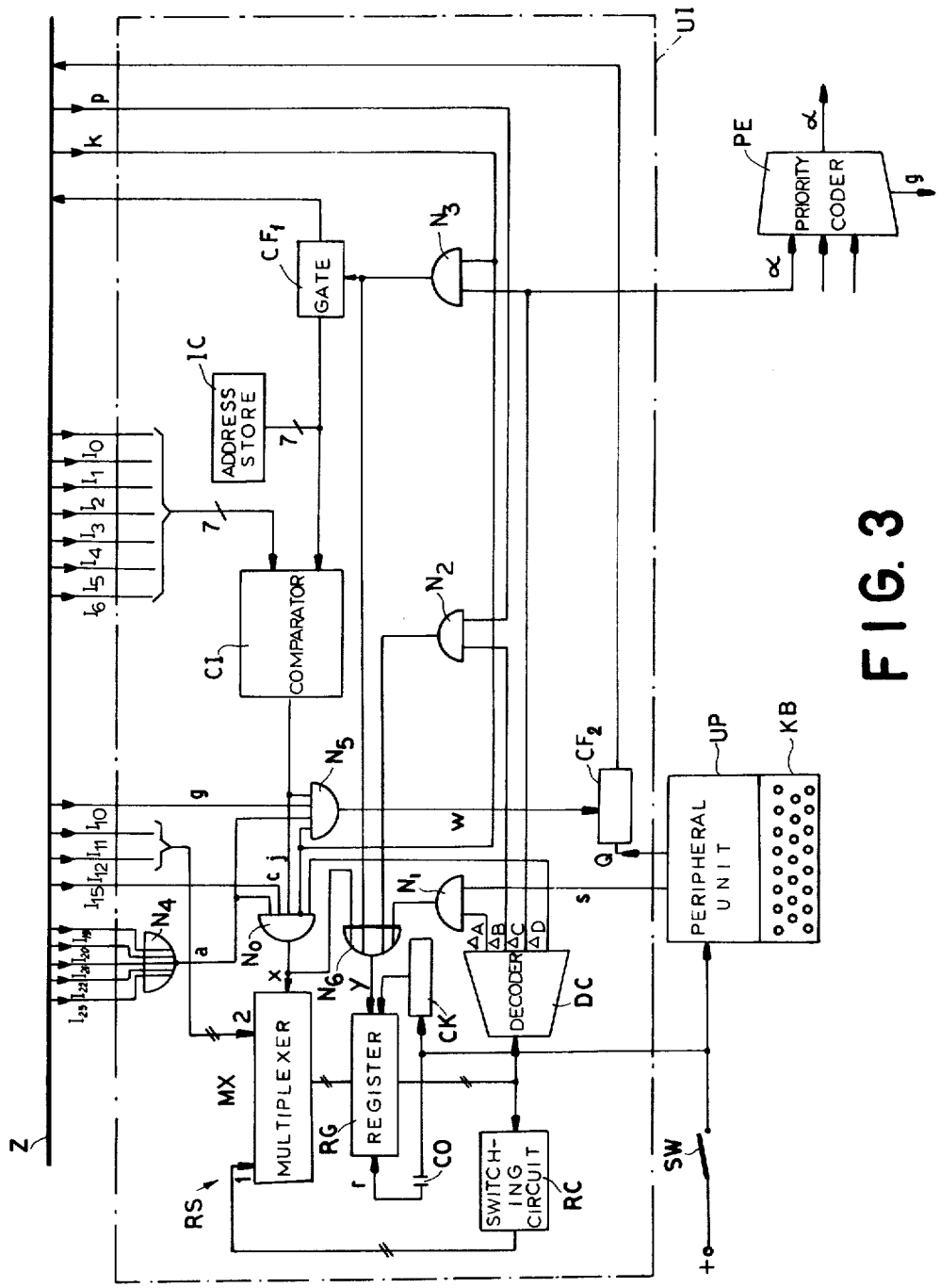
FIG. 3 is a more detailed diagram of an interface unit representative of those shown in FIG. 1.

In FIG. 1 we have shown part of an electronic data-handling system including a central processor UE and a multiplicity of peripheral units, the latter being arranged in several levels $UP_1$, $UP_2$, ... $UP_n$, $UP_1'$, $UP_2'$, ... $UP_n'$, $UP_1''$, $UP_2''$, ... $UP_n''$ of different ranks. (The number of units per level need not be the same.) Each peripheral unit is individually associated with an interface unit respectively designated $UI_1$, $UI_2$ ... $UI_n$, $UI_1'$, $UI_2'$, ... $UI_n'$, $UI_1''$, $UI_2''$, ... $UI_n''$. It may be assumed, by way of example, that peripheral units $UP_1$-$UP_n$ are of the slow-operating type whereas units $UP_1'$-$UP_n'$ operate at a higher speed not requiring any program interruption; units UP₁''-UPₙ'' may be of the fast-operating type allowing the exchange of data with the processor by direct access (DMA) to the processor memory. A priority coder PE has different inputs for the several levels and establishes an order of precedence within each level; for the sake of clarity, coder PE is shown separate from a control unit CN of processor UE even though it may actually form part of that control unit, as shown in the aforementioned Bambara et al application Ser. No. 839,883 whose disclosure is hereby incorporated by reference into the present application.

The interface units $UI_1$-$UI_n$ associated with peripheral units $UP_1$-$UP_n$ communicate with corresponding inputs of coder PE via respective leads on which a program-suspension request α appears whenever a corresponding peripheral unit is about to transmit data to the processor UE. The presence of such a request signal α initiates a program interruption as described in the Bambara et al patent; it also gives rise to a signal g, sent to control unit CN for inhibiting further suspension requests during interruption of the program. It should be noted that the processor temporarily deactivates any peripheral unit from which a suspension request is being received; in its deactivated condition, a peripheral unit can only transmit its accumulated data to the processor, within the time interval allocated for such transmission, but cannot generate new data.

The communication path between the processor UE and the several peripheral units comprises a bidirectional bus Z extending between the processor and the associated interface units. FIG. 2 illustrates schematically an input/output instruction (differing somewhat from the corresponding instruction in the Bambara et al patent) which can be read out on this bus from a program memory within the processor, under the control of a program counter, to command the exchange of data between the processor and a particularly designated peripheral unit; while such data exchanges may proceed in either direction, we are here concerned only with input instructions calling for the transmission of data from the peripheral unit to the processor.

The macroinstruction shown in FIG. 2 consists of 24 bit positions divided into five sections. Positions $I_{23}$-$I_{16}$ define an 8-bit operative code distinguishing the several types of instructions from one another. Positions $I_{15}$-$I_{13}$ constitute a 3-bit microcommand section serving, for example, to provide timing signals required in the operation of the peripheral unit to which the instruction is addressed. Positions $I_{12}$ and $I_{11}$ form a 2-bit code designed to alter the state of the peripheral unit (or, more precisely, of a sequential network in the associated interface unit as more fully described hereinafter). Positions $I_{10}$-$I_7$ constitute a 4-bit function code indicating the type of input/output operation to be carried out; one of these bits (specifically the one in position $I_{10}$) discriminates between input and output instructions. Finally, positions $I_6$-$I_0$ represent a 7-bit address code of the peripheral unit concerned.

FIG. 3 shows a unit UI representative of any of the interface units $UI_1$-$UI_n$ of FIG. 1; also shown in FIG. 3 is the associated peripheral unit UP, here depicted as a teletypewriter provided with a keyboard KB.

Interface unit UI comprises a sequential network RS which includes a multiplexer MX, a two-bit register RG and a switching circuit RC. A two-conductor multiple, indicated schematically, connects these components in a closed feedback loop, with circuit RC working into a first input 1 of multiplexer MX which is also provided with a second input 2 connected to two leads of bus Z carrying the bits $I_{11}$ and $I_{12}$ of an input/output instruction. Multiplexer MX normally stands on its input 1 but is shiftable to its input 2 by a signal x issuing from an AND gate $N_0$ for loading the register with these bits. The bit combination stored in register RG determines the state of network RS; thus, for example, the quiescent state D may be represented by the configuration 0, 0, the preparatory state A may be defined by bits 0, 1, the intermediate state B may have the configuration 1, 0 and the active state C may be marked by bits 1, 1. Switching network RC, in that case, can be a simple binary incrementer which reads out the bits 1, 0 (state B), 1, 1 (state C) and 0, 0 (state D) upon receiving, respectively, the bits 0, 1 (state A), 1, 0 (state B) and 1,1 (state C) at its input. With register RG in state D, however, the bit combination 0, 0 is passed unchanged by circuit RC to multiplexer input 1.

A decoder DC is connected to the output of register RG, in parallel with switching circuit RC, to mark the existence of any of the network states A-D by energizing a corresponding output lead with a respective switching signal $\Delta_A$, $\Delta_B$, $\Delta_C$ or $\Delta_D$. A clock circuit CK, suitably synchronized with a time base in the processor, emits a train of equispaced pulses commanding the loading of register RG with a new bit combination from the output of multiplexer MX in the presence of an enabling signal y. When the system is first taken into operation, clock circuit CK and other components are energized by connection to a power-supply terminal (+) upon closure of a manual switch SW. The resulting pulse is passed by a capacitor CO to a resetting input r of register RG for initial establishment of the quiescent state D therein.

The enabling signal y, originating at an OR gate $N_6$, is given by $$y = x + s \cdot \Delta_A + p \cdot \Delta_B + k \cdot \Delta_C \tag{1}$$

where s is the data-ready signal coming from the associated peripheral unit UP, p is an authorization signal sent out by control unit CN to indicate the absence of overriding priorities, and k is the confirmation signal arriving from the processor UE upon institution of the program-interrupting microroutine in response to a suspension request α emitted by unit UI; the request signal α, it will be noted, is branched off the signal $\Delta_C$ in the output of decoder DC. Signals $\Delta_A$, $\Delta_B$ and $\Delta_C$ are fed to three AND gates $N_1$, $N_2$ and $N_3$ also receiving the signals s, p and k, respectively; these AND gates work into respective inputs of OR gate $N_6$ which also receives the signal x from AND gate $N_0$.

Signal x is given by $$x = j \cdot d \cdot c \cdot \Delta_D \cdot \overline{k} \tag{2}$$

where j, d and c represent three signals available in the presence of an input/output instruction intended for peripheral unit UP. Signal c is a state-change command represented by a bit appearing in one of the bit positions of microcommand section $I_{15}$-$I_{13}$ shown in FIG. 2, here specifically position $I_{15}$; if that instruction were destined for a peripheral unit not requiring a program interruption, signal c would be absent. Signal d identifies the macroinstruction present on bus Z as an input/output instruction characterized, for example, by a "0" in each of the first five bit positions $I_{23}$-$I_{19}$ as in the system of the prior Bambara et al patent; this signal is thus delivered by a NOR gate N4 with inputs connected to the leads carrying those five bits. Signal j indicates that the instruction is indeed destined for the peripheral unit UP associated with the interface unit UI here considered; the address code of this peripheral unit is hard-wired in a store IC connected via a 7-lead multiple to an input of a comparator CI whose other input receives the bits $I_6$–$I_0$ of the address section via a similar multiple, comparator CI emitting the signal j when the two codes are identical. AND gate $N_0$, accordingly, has noninverting inputs connected to receive signal d from NAND gate $N_4$, signal c from bus Z, signal j from comparator CI and signal $\Delta_D$ from decoder DC; an inverting input of gate $N_0$ receives the signal k from bus Z. AND gate $N_3$ also works into a control input of a gating circuit $CF_1$ designed to pass the address code from store IC to bus Z. When the network RS has reached its active state C, another such gating circuit $CF_2$ transmits the data available in unit UP to the same bus in the presence of a transfer command w generated by an AND gate $N_5$ to which signals j, d and k are fed along with a signal q from bit position $I_{10}$ discriminating between input and output instructions as mentioned above. Transfer command w can thus be expressed by $$w = j \cdot d \cdot q \cdot k. \tag{3}$$

The mode of operation of sequential network RS is illustrated schematically in FIG. 4 which shows a transition from state A to state B in the presence of signal s, a transition from state B to state C in the presence of signal p, and a transition from state C to state D in the presence of signal k. From quiescent state D, network RS can be shifted into any one of its other states (as indicated by dot-dash lines) according to the bit configuration $I_{11}$, $I_{12}$ contained in the input/output instruction present on bus Z. Thus, in a situation in which the corresponding peripheral unit UP is presumed to have data always available for transmission (as where that unit comprises a thermometer or some other continuously operating sensor), the appearance of the input/output instruction may shift the network RS directly from state D to state B without waiting for a data-ready signal s; in other instances the shift may be immediately to state C, without priority considerations. Such a jump transition may also be induced by the processor for testing purposes.

In the following description of the mode of operation of the unit UI shown in FIG. 3, however, it will be assumed that the network RS is to be stepped through its full operating sequence.

With register RG in state D, the appearance of an input-output instruction giving rise to signals c, d and j generates the switching signal x according to equation (2) along with the enabling signal y as per equation (1). The bit combination (e.g. 0, 1) present in positions $I_{12}$, $I_{11}$ is thus loaded into register RG, upon the occurrence of a clock pulse, to establish the preparatory state A. With the disappearance of signal $\Delta_D$ from the output of decoder DC, signals x and y are terminated. Switching circuit RC delivers a bit combination indicative of the next-following state B, e.g. 1, 0, to input 1 of multiplexer MX.

If unit UP has data available for transmission to processor UE (FIG. 1), AND gate $N_1$ conducts to recreate the enabling signal y so that this new bit combination is loaded into register RG on the next clock cycle. This establishes the intermediate state B and cancels the signal $\Delta_A$ in the output of decoder DC, along with the enabling signal y. A modified bit combination such as 1, 0, signifying the next-following state C, is now fed to multiplexer input 1 by switching circuit RC.

If the upper input of priority coder PE does not receive at this time a request signal α from any of the other peripheral units connected to that input, inhibiting signal g will be absent and control unit CN (FIG. 1) will emit the authorization signal p as soon as there are no higher-ranking operations to be performed, such as the execution of a jump at the end of the microroutine. Signal p passes the AND gate $N_2$, unblocked by the output signal $\Delta_B$ of decoder DC, and regenerates the enabling signal y to permit the switchover of register RG to state C on the next clock pulse. With the disappearance of signals $\Delta_B$ and y, this condition persists until the processor sends out the confirmation signal k indicative of the establishment of a program-interrupting microroutine by the control unit CN (in the prior Bambara et al U.S. Pat. No. 4,160,289, a counterpart of confirmation signal k has been designated $JM_p$). With signal $\Delta_C$ appearing in the output of decoder DC and giving rise to the request signal α at the top input of priority coder PE, AND gate $N_3$ is unblocked to let the signal k open the gate $CF_1$, which preferably has a high output impedance, for the passage of the address of unit UP to the processor by way of bus Z; this operation also generates, once more, the enabling signal y to restore the register RG to its quiescent state D upon the occurrence of the next clock pulse. As long as signal k is present, however, multiplexer MX cannot be switched to its input 2 so that there is no repetition of the aforedescribed sequence until the control unit CN has terminated the program-interrupting microroutine and has commanded the readout of a new macroinstruction from the program store of the processor. The transmission of data Q from unit UP through the processor by way of gate $CF_2$ ends with the disappearance of transfer command w.

We claim:

1. An interface unit for facilitating communication in an electronic data-handling system between a processor having a program memory and one of a plurality of peripheral units adapted to transmit data to said processor, the latter being provided with preferential circuitry for assigning different priority ratings to certain of said peripheral units and being programmed to emit a succession of instructions respectively directed to said peripheral units for inviting the transmission of data available thereat, such data transmission requiring an interruption of the program of the processor, the latter having two output leads carrying a two-bit portion of an input/output instruction generated by said program memory, said interface unit comprising:

a register for the storage of first, second, third and fourth bit combinations respectively representing a plurality of states including a preparatory state, an intermediate state, an active state and a quiescent state;

a decoder connected to an output of said register for respectively converting said first, second, third and fourth bit combinations into a first switching signal denoting said preparatory state, a second switching signal denoting said intermediate state, a third switching signal denoting said active state and a fourth switching signal denoting said quiescent state;

loading means with input connections to said decoder and to said output leads of the processor for entering said first bit combination in said register upon coincidence of said fourth switching signal with an instruction addressing the associated peripheral unit;

first gating means with input connections to said decoder and to the associated peripheral unit for emitting an enabling signal to said register upon coincidence of said first switching signal with a data-ready signal from said associated peripheral unit;

second gating means with input connections to said decoder and to said preferential circuitry for emitting an enabling signal to said register upon coincidence of said second switching signal with an authorization signal indicating the absence of overriding priorities;

third gating means with input connections to said decoder and to the processor for emitting an enabling signal to said register upon coincidence of said third switching signal with a confirmation signal indicative of a program interruption, said third gating means also establishing a path for the transmission of the address of the associated peripheral unit to the processor preparatorily to the initiation of direct communication therebetween;

a binary incrementer connected to the output of said register for converting said first, second and third bit combinations into said second, third and fourth bit combinations, respectively; and feedback means connecting said incrementer to said register for entering therein the converted bit combinations in response to the enabling signal from any of said gating means, said feedback means including a multiplexer with a first input connected to said incrementer and a second input connected to said output leads of the processor, said multiplexer being switchable by said loading means from said first input to said second input in the presence of said instruction and said fourth switching signal.

2. An interface unit as defined in claim 1 wherein said decoder has an output lead extending to a priority decoder, forming part of said preferential circuitry, for emitting thereto said third switching signal as a program-suspension request.

* * * * *